United States Patent [19]

Svetlik

[11] Patent Number: 5,896,885
[45] Date of Patent: Apr. 27, 1999

[54] TAPPING SADDLE PIPE FITTING

[75] Inventor: Harvey E. Svetlik, Dallas, Tex.

[73] Assignee: Phillips Petroleum Company, Bartlesville, Okla.

[21] Appl. No.: 08/661,689

[22] Filed: Jun. 11, 1996

[51] Int. Cl.[6] .................... F16K 43/00; F16L 41/092; F16L 41/06
[52] U.S. Cl. ................... 137/15; 137/318; 219/535; 285/197; 408/102
[58] Field of Search .................. 137/15, 318; 219/535, 219/544; 285/197; 408/101, 102, 137

[56] References Cited

U.S. PATENT DOCUMENTS

| | | | |
|---|---|---|---|
| 2,736,335 | 2/1956 | Webber | 137/318 |
| 2,794,352 | 6/1957 | Mueller | 137/318 |
| 2,839,075 | 6/1958 | Mueller | 137/318 |
| 3,503,407 | 3/1970 | Ver Nooy | 137/318 |
| 3,692,044 | 9/1972 | Wise | 137/318 |
| 3,799,182 | 3/1974 | Long | 137/318 |
| 3,827,448 | 8/1974 | Alba | 137/15 |
| 3,905,718 | 9/1975 | Luckenbill et al. | 137/318 |
| 3,907,625 | 9/1975 | Vogelsanger | 285/197 |
| 3,948,282 | 4/1976 | Yano | 137/318 |
| 3,976,091 | 8/1976 | Hutton | 137/318 |
| 4,216,793 | 8/1980 | Volgstadt et al. | 137/318 |
| 4,541,447 | 9/1985 | Soumar et al. | 137/15 |
| 4,655,480 | 4/1987 | Thalmann | 285/21 |
| 4,680,848 | 7/1987 | Goldner | 137/318 |
| 4,730,636 | 3/1988 | Volgstadt et al. | 137/15 |
| 4,832,069 | 5/1989 | Gale et al. | 137/318 |
| 4,894,521 | 1/1990 | Evans | 285/197 |
| 5,076,318 | 12/1991 | Fedora | 137/318 |
| 5,105,844 | 4/1992 | King, Sr. | 137/15 |
| 5,257,644 | 11/1993 | Saha et al. | 137/318 |
| 5,443,095 | 8/1995 | Glossop, Jr. | 137/318 |
| 5,577,529 | 11/1996 | Katz | 137/318 |

FOREIGN PATENT DOCUMENTS 2359359 3/1978 France ...................... 285/197

*Primary Examiner*—George L. Walton
*Attorney, Agent, or Firm*—George E. Bogatie

[57] ABSTRACT

A compact hot-tap saddle pipe fitting made of weldable plastic material integrates a branch saddle and a tubular adapter into a monolithic tee shaped unit. The fitting, which is characterized by short overall dimensions and a reinforced base portion, allows a fully pressure rated connection of a branch line to a main plastic pipeline using an isolation valve and a standard size hot-tap cutting tool.

9 Claims, 4 Drawing Sheets

TAPPING SADDLE PIPE FITTING

This invention relates to pipe fittings made of weldable plastic material. More particularly it relates to a hot-tap fitting for connecting a branch pipe to a main pipeline, wherein the fitting facilitates temporary connection of a standard hot-tap tool to the main plastic pipeline, followed after tapping, by permanent connection of the branch-pipe to the main pipe at full pressure rating.

BACKGROUND OF THE INVENTION

The need to add new customer service branch pipes to existing main gas or water utility pipelines has long been recognized. The safest method is to isolate the section of main pipeline, depressurize, purge, cut a hole, clean out, and permanently attach a tee adapter to which the branch pipe can be attached while the pipeline is depressurized. However, to reduce service interruptions to existing customers connected to the main pipeline, hot tapping tools have been developed for metallic pipelines that can drill or cut into the main pipeline while still in service under gas or water pressure. Prior art for hot-tapping a main plastic pipeline involves attaching a pipe saddle fitting to the main pipeline and then attaching an appropriate tubular adapter having a flange, or some type of mechanical joint outlet connector, to the pipe saddle fitting. Finally, a short length of branch pipe is connected to the tubular adapter, and a hole is drilled in the main pipeline for fluid communication with the branch pipe. A tapping tool, which includes a compression seal butted against the open end of the branch pipe, a drill mounted on a shaft extending through the compression seal and the pipe saddle, and means to advance/retract the drill bit from outside the fitting, is then used to drill the hole in the main pipeline. After the hole is drilled, the drill bit is retracted toward the compression seal within the now pressurized length of branch pipe. If a full flow valve is not included in the branch pipe, a squeeze off tool is used to seal the branch pipe near the pipe adaptor, before removal of the tapping tool. After attaching the remainder of the branch pipe to the tapped section, the full flow valve is opened, or the squeezed section of the branch pipe is rerounded. Use of hot tapping tools has become so common, especially in water distribution, that the manufacturers of the tools have developed dimensional standards for hot tap tools offered for sale.

Several problems, however, are inherent in the prior art techniques for using the standard hot-tap tool on plastic pipelines. The use of the hot-tap tool requires extensive evacuation/back filling for buried pipelines, such that restricted access may prevent installation of the hot tap tool in some locations.

Another problem is that commercially available plastic pipe saddle fittings and plastic tubular adapters having flange or mechanical joint outlet connections are of lengthy and bulky construction. Accordingly, when an available plastic tubular adapter is fused to an available plastic pipe saddle fitting, the passageway of the resulting assembly, through which the drill bit of the tapping tool must pass, is too long to allow use of many commonly sized tapping tools.

Other problems arise because commercially available plastic pipe saddle fittings lack sufficient mass, especially in the base section of the saddle, to overcome the weakening effects of a hole cut in the main pipeline. Once the hole in the main pipe has been cut and the coupon removed, the lack of sufficient mass in the base of the saddle fitting also results in inadequate contact surface for fusion to the main pipe. Accordingly, the lack of contact surface and/or reinforcing mass in the plastic saddle, result in failure of the fitting to provide a pressure rating equal to that of the main host pipe.

Accordingly, a need for a single compact plastic fitting exists. The single fitting desirably integrates the pipe saddle fitting and an appropriate outlet adapter in a single piece having suitable dimensions and strength, by which a tap for a service branch connection may be made into a plastic pipeline using hot tap tools of commercially available dimensions.

It is an object of this invention to provide a permanent saddle fitting of the type described above which is formed as a monolithic unit.

Another object is to provide a permanent pipe fitting for attaching a branch pipe that simplifies temporary use of a standard size hot-tap tool.

It is another object of this invention to provide a fully pressure rated branch outlet connection to a plastic pipe main.

Yet another object of this invention is to provide a fitting for a hottap tool where the fitting does not require temporary clamping of a saddle to the main pipeline.

SUMMARY OF THE INVENTION

According to the present invention, the foregoing and other objects and advantages are attained by a compact monolithic tapping saddle pipe fitting made of weldable plastic, and having dimensions that facilitate use of a standard hot-tap tool. The compact plastic fitting also adapts to a branch pipe to be permanently joined at full pressure rating to a main pipeline. When the standard hot-tap tool is used for plastic pipelines it must be temporarily attached close to the pipeline to be tapped, and the compact size of the inventive fitting facilitates use of the standard tool for hot-tapping plastic pipe. The tapping saddle fitting, which is preferably formed of weldable plastic material, includes a reinforced pipe saddle member having a central opening. The saddle is permanently joined to one end of a tubular connection member to form a tee shape plastic pipe fitting having an open passageway extending through the saddle and the tubular member. The fitting is mountable on a main plastic pipeline with the axis of the pipe saddle substantially in alignment with the axis of the main pipeline, and the axis of the tubular member disposed substantially transverse of the axis of the pipe saddle.

According to one aspect of this invention the plastic tapping saddle pipe fitting is fabricated using either a molding operation, or formed in a machined fabrication from suitable "bar stock" to produce a monolithic unit. In another aspect the outlet end of the tubular connection member includes either a flange or a mechanical joint for outlet connections. In yet another aspect the tapping saddle fitting is secured to the main pipeline to be tapped using either heat-fusion, or electro-fusion, or solvent welding.

Other objects and advantages of the invention will be apparent from the appended claims and from the detailed description of the invention when read in conjunction with the accompanying drawings in which:

DETAILED DESCRIPTION OF THE INVENTION

Figure 1:
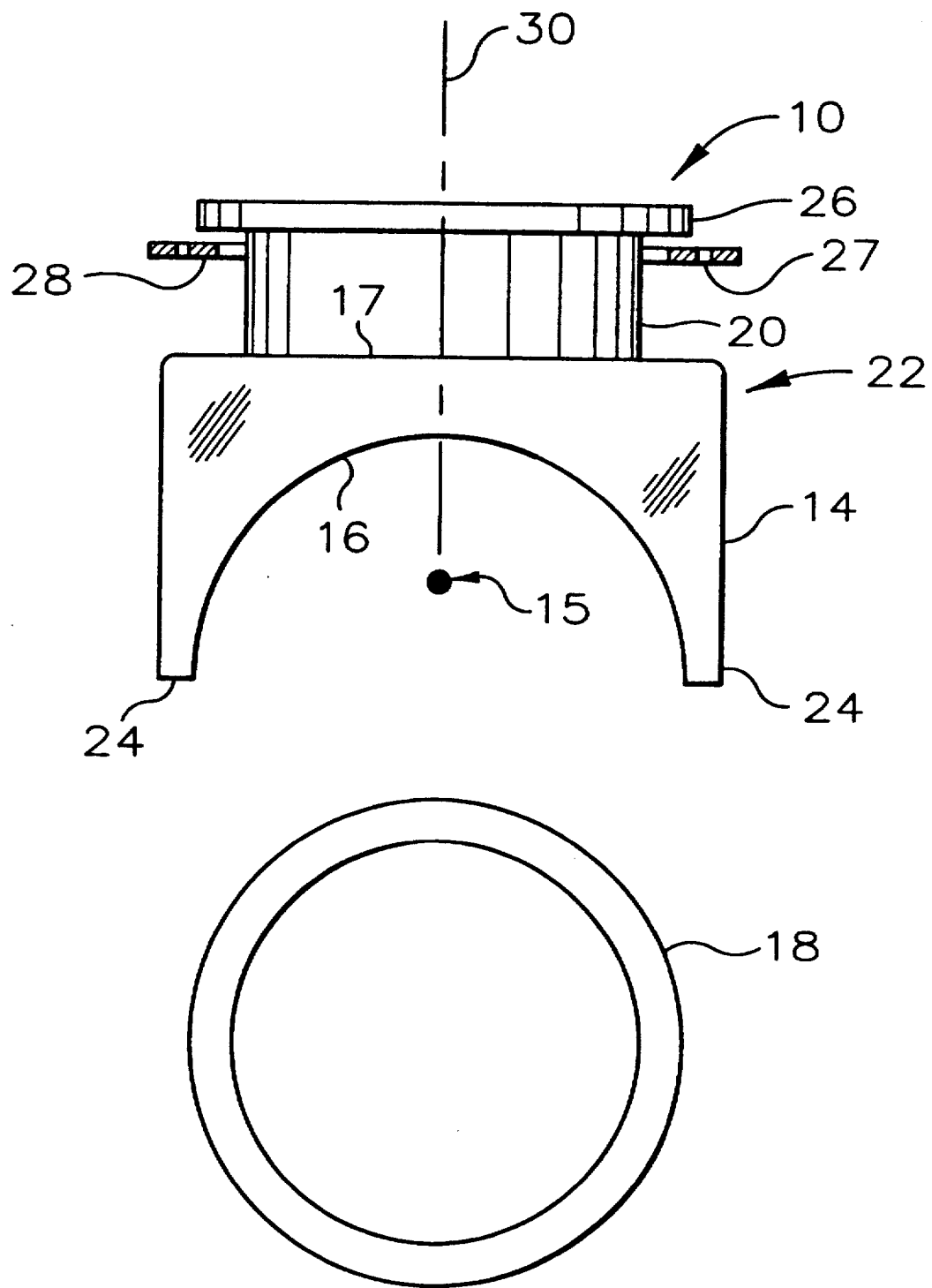
FIG. 1 is an elevation end view of a plastic hot-tap saddle pipe joint fitting according to this invention, where the saddle is arranged to be placed on a pipeline, and the branch outlet is effected by a flange connection.

Referring now to FIG. 1, a monolithic tapping saddle pipe joint fitting shown generally at 10, preferably formed of a moldable plastic material, includes an axially extending tubular connection member 20 having a flange 26 for affecting an outlet connection, and an axis 30. The monolithic fitting 10 also includes a pipe saddle member 22 having two oppositely disposed shoulder members 24. The pipe saddle member has an axis 15. As shown in FIG. 1, the pipe saddle fitting has a curved surface 16 suitable for positioning the fitting on a main pipeline 18. In the mounted position, the axis 15 of the saddle member 22 extends generally in parallel relation with the axis of the main pipeline 18. The axis 30 of the tubular connection member 20, extends transversally to the axis 15 of pipe saddle member 22 thus extending outwardly from the saddle member 22 and the main pipeline 18. The tubular connection 20 forms a passageway 12, which extends through a central opening in the pipe saddle 22, and through which a medium flowing in the pipeline 18 can enter the tubular connection member 20 through a tapped hole in the pipeline 18.

Also as viewed in FIG. 1, the saddle member 22 has an upper shell shaped section 14 having a circumferentially extending inner surface 16 that extends for an angular extent of about 180°. The circumferential inner surface 16 is arranged to extend around part of the circumference of the main pipeline 18, and also extends in the axial direction of the main pipeline 18. The angular extend of the circumferentially extending inner surface 16 of the shell shaped section 14 is arranged so that the pipe joint fitting 10 can be positioned radially about the axial direction of the pipeline 18. Preferably the saddle member 22 has a snug fit to the pipeline so that a snapping or gripping action is noticed when it is placed on the pipeline 18. Accordingly, in the mounted position the pipe saddle member 22 extends in generally parallel relation with the pipeline axis, and the tubular member 20 is disposed transversally of the pipe saddle member 22, thus extending outwardly from the saddle member 22 and the main pipeline 18. A split flange ring 28 having a bolt hole 27 facilitates connection of the flange 26 to a branch pipe (not illustrated) having a similar end connection.

Figure 2:
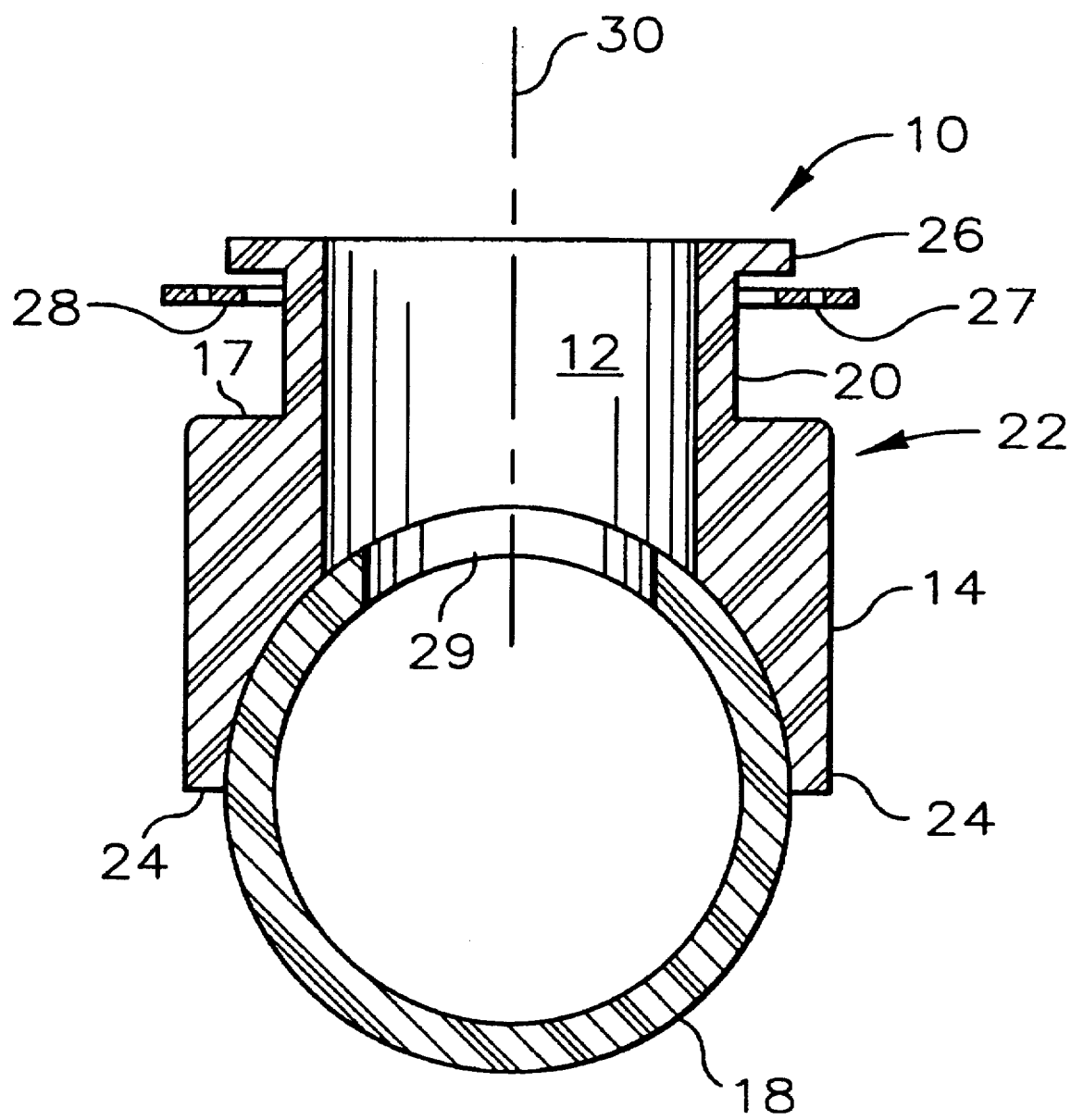
FIG. 2 is an elevation view in cross section, illustrating the plastic hot-tap saddle pipe joint fitting co-joined with the pipeline main by fusion.

Referring now to FIG. 2, where like reference numerals are used for the parts of the fitting illustrated in FIG. 1, there is illustrated a tapped hole 29 in the pipeline 18 and the opening in saddle member 22 that cooperate with the tubular member 20 to form a fluid passage zone 12. Fluid passage zone 12, which includes the tubular member 20, opens through the inner surface 17 of the saddle member 22 so that it encircles the tapping connection opening 29 made in the pipeline 18. The diameter of the opening in the main pipeline 18 may be nominally equal to the inside diameter of the main pipe 18, or tapped hole 29 may be reduced in size and be smaller than the inside diameter of the main pipe 18. The passage zone 12 is substantially round in section transverse to the axis 30.

Figure 3:
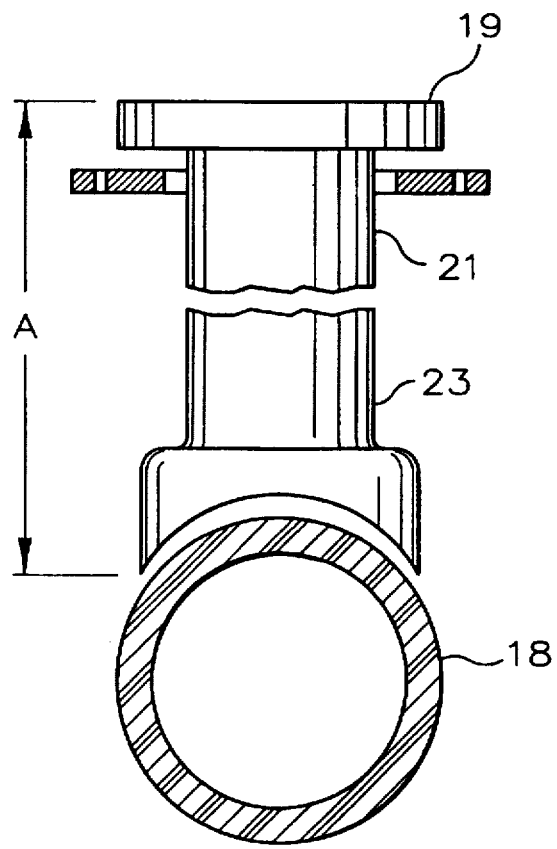
FIG. 3 is an elevation end view of a prior art combination of two separate fittings for connecting a branch pipe.

FIG. 3 illustrates a prior art technique using two separate fittings to affect a branch pipe connection. In this prior art scheme an outlet adapter 21 having a flange 19 is fused to a branch saddle 23 and the fused combination of adapter 21 and saddle 23 is attached to the main pipeline 18. Using this arrangement, however, results in a distance from the flange 19 to the main pipe 18 (illustrated as dimension A), that is too long to allow use of a standard size commercially available hot-tapping tools.

Figure 4A:
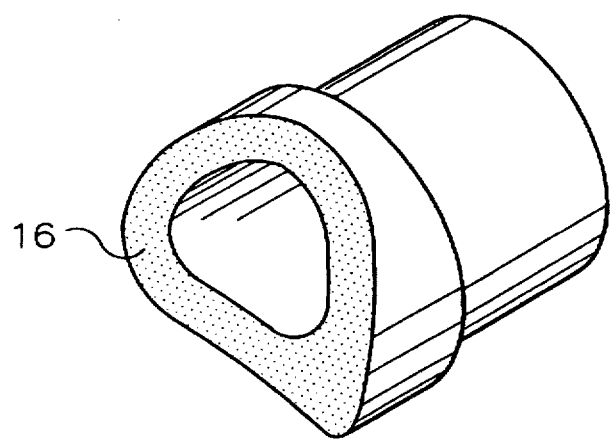
FIG. 4A is a perspective view illustrating a prior art plastic branch saddle having insufficient reinforcing mass.
Figure 4B:
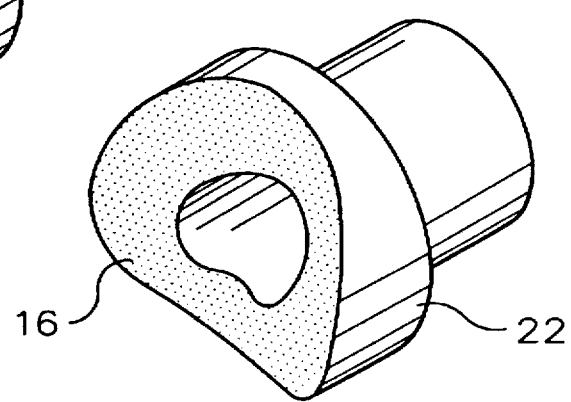
FIG. 4B is a view, similar to FIG. 4A, having enlarged heat-fusion area according to one aspect of the invention.

FIG. 4A illustrates a prior art branch saddle fitting having insufficient reinforcing mass, and accordingly insufficient heat-fusion contact area 16 to obtain full pressure rating of the fitting when attached to a main pipe. FIG. 4B illustrates one aspect of this invention that provides heat-fusion area 16 and reinforcing mass 22 in the base area necessary to achieve a fitting pressure rating equal to that of the untapped main pipe.

A simple monolithic production of a molded branch saddle fitting 10 can be affected from plastic material in an injection molding procedure. Alternately a production of the fitting 10 can be effected by machining from suitable "bar stock" material. Selection of plastic material for fabrication of the tapping saddle fitting 10 should be compatible with the fluid being transported by the pipe being tapped. Preferably it is formed of synthetic resinous materials such as thermoplastics. Suitable thermoplastic materials include olefin polymers and normally solid, moldable polyamide polymers with a preferred olefin polymer being a high density polyethylene, and a preferred polyamide polymer being nylon.

In use the tapping saddle pipe joint fitting 10 is first securely attached to the main plastic pipe 18 to be tapped by any suitable means such as heat-fusion or electro-fusion. For example, the fitting 10 can be attached by fusing the saddle portion 22 of the plastic fitting 10 to the main pipe 18 with the use of a heating iron or the like. As previously mentioned electro-fusion or solvent welding may also be employed, and thereafter, a standard hot tap tool is attached. Heating irons for attaching the plastic saddle 22 of the fitting to the main plastic pipe have found widespread use. The heating iron typically has a curvature complementary to the curvature of the fitting to facilitate simultaneous heating of the surfaces of the saddle 22 and the main plastic pipe 18 until the plastic at the junction of the two surfaces softens and melts. When sufficient softening or melting has occurred, the heating iron is removed and the saddle 22 of the fitting that contacts pipe 18 is directly fused to the main pipe 18, followed by cooling.

Figure 5:
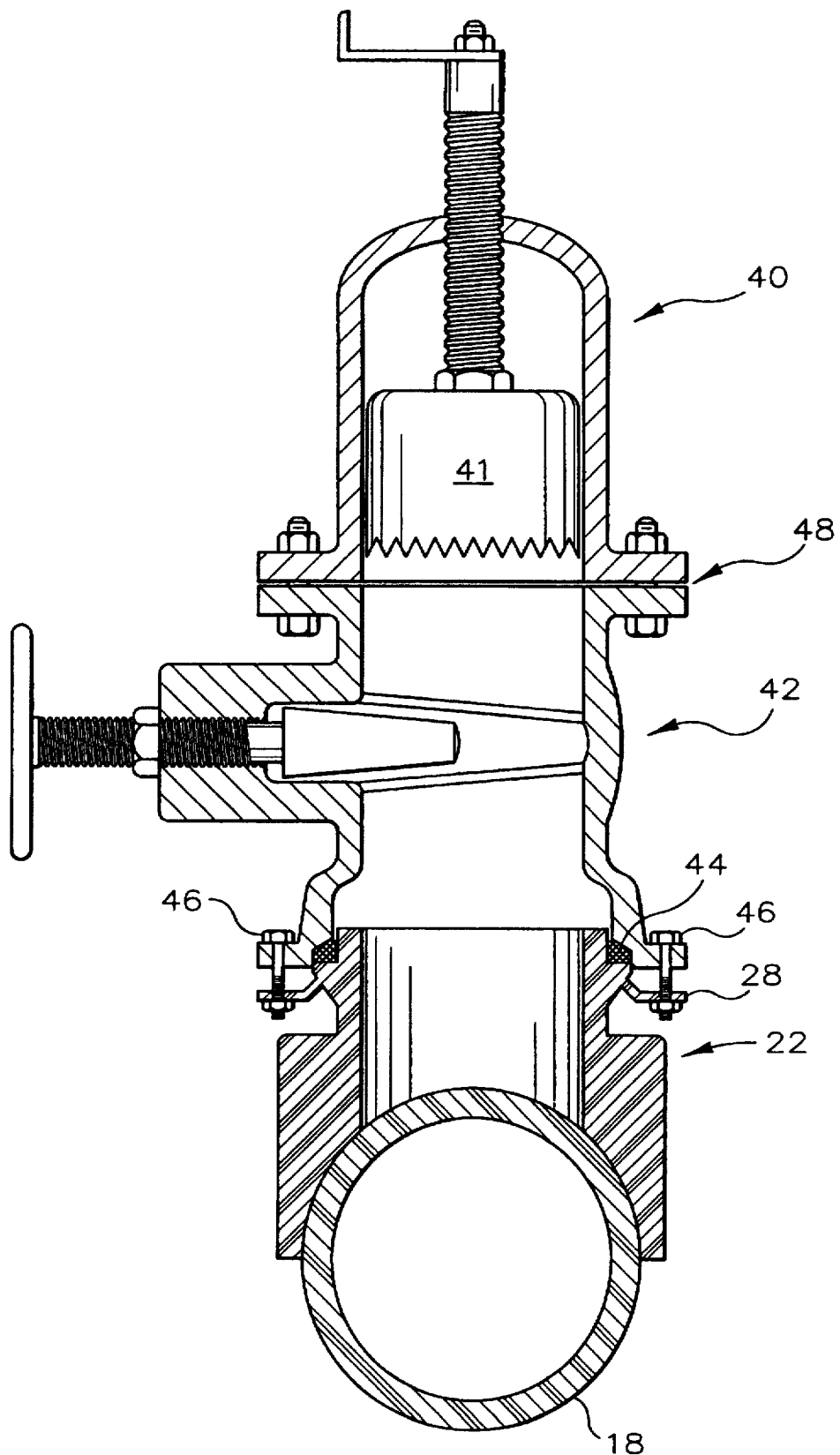
FIG. 5 is an elevation view in cross section illustrating essential features of a commercially available standard hot-tap tool secured to a pipeline through a hot-tap saddle according to this invention, including a mechanical joint option for connection of a shut-off valve.

Referring now to FIG. 5, where like reference numerals are used for the parts of the fitting illustrated in FIG. 1, there is illustrated a standard commercially available hot-tap tool 40 and an isolation valve 42 installed on a plastic tapping saddle pipe fitting 22, and positioned to cut into a pressurized main pipe 18 by advancing a cutter 41 through the pipeline 18. As illustrated a mechanical joint is used to connect the plastic fitting 22 and the metal isolation valve 42. The mechanical joint includes a rubber gasket 44 and draw bolts 46. While any suitable connections between the parts illustrated in FIG. 5 is satisfactory, a flange connection between the hot-tap tool 40 and the isolation valve 42 is illustrated. The isolation valve and the hot-tap tool, used in the practice of the invention illustrated in FIG. 5, are each well known components available in various sizes and from various vendors such as Mueller Co., 500 West Eldorado St., Decatur, Ill. 62525.

This invention has been described in reference to a standard hot-tap tool having dimensions for use with metal pipe fittings, and which can be used with a novel tapping saddle of the present invention for tapping plastic pipe. Reasonable modifications and alterations of this invention will become apparent to those skilled in the art from the foregoing discussion and accompanying drawings, and it should be understood that this invention is not to be unduly limited thereto.

That which is claimed is:

1. A monolithic saddle fitting formed of weldable plastic material for making a branch connection to a main plastic pipe, wherein said saddle fitting is adapted for heat fusion to said main pipe using a heating iron having a curvature complimentary to the curvature of the outer surface of said main pipe, and wherein temporary clamping of said saddle fitting to said main pipe is not required prior to using said heating iron to fuse said saddle fitting to said main pipe, said saddle fitting comprising:
   a) a saddle member having a circumferentially extending surface of about 180 degrees angular extent, said saddle member being mountable on said main pipe;
   b) wherein dimensions for said circumferentially extending surface of said saddle member facilitates initial attachment of said saddle fitting to said main pipe by rendering a gripping action when placed on said main pipe; and
   c) a tubular connection member for connecting a branch pipe, said connection member comprising an axially extending tube joined at one end to said saddle member in alignment with a central opening in said saddle member so as to allow fluid flow through said branch pipe.

2. A monolithic saddle fitting in accordance with claim 1, wherein said monolithic fitting is formed of an olefin polymer.

3. A monolithic saddle fitting in accordance with claim 1, wherein a hole cut in said main pipe and the inside diameter of said tubular connection member are substantially equal to the bore diameter of said main pipe.

4. A monolithic saddle fitting in accordance with claim 3, wherein said saddle fitting contains a reinforcing mass sufficient to overcome the weakening effect of said hole cut in said main pipe.

5. A monolithic saddle fitting in accordance with claim 1, wherein said tubular connection member is a stub length tube.

6. A monolithic saddle fitting in accordance with claim 5, wherein a second end of said tubular connection member terminates in an outlet connection selected from the group of connections consisting of:

a flange connection; and a mechanical joint connection.

7. A method of tapping a main plastic pipe while in service under gas or water pressure, said method comprising:
   a) securely heat fusing a monolithic saddle fitting formed of a weldable plastic material to said main pipe using a heating iron having a curvature complimentary to the curvature of the outer surface of said main pipe, and wherein temporary clamping of said saddle fitting to said main pipe is not required prior to using said heating iron to fuse said saddle fitting to said main pipe, said saddle fitting comprising:
      i) a saddle member having a circumferentially extending surface of about 180 degrees angular extent, said saddle member being mountable on said main pipe;
      ii) wherein dimensions for said circumferentially extending surface of said saddle member facilitates initial attachment of said saddle fitting to said main pipe by rendering a gripping action when placed on said main pipe;
      iii) a tubular connection member for connecting a branch pipe, said connection member comprising an axially extending tube joined at a first end to said saddle member in alignment a central opening in said saddle member so as to allow fluid flow through said branch pipe;
   b) operably attaching a hot-tap tool to said main pipe through said saddle fitting; and
   c) operating said hot-tap tool to cut a hole in said main pipe.

8. A method in accordance with claim 7, wherein said monolithic saddle fitting is formed of an olefin polymer.

9. A method in accordance with claim 7, wherein said hole cut in said main pipe and the inside diameter of said tubular connection member are substantially equal to the bore diameter of said main pipe.

* * * * *